United States Patent [19]

Thomas

[11] 4,291,338
[45] Sep. 22, 1981

[54] AUTOMATIC EXPOSURE CONTROL FOR PULSED ACTIVE TV SYSTEMS

[75] Inventor: Larry A. Thomas, Pasadena, Md.

[73] Assignee: The United States of America as represented by the Secretary of the Navy, Washington, D.C.

[21] Appl. No.: 144,811

[22] Filed: Apr. 29, 1980

[51] Int. Cl.³ .............................................. H04N 5/26
[52] U.S. Cl. .................................................... 358/228
[58] Field of Search ........................................ 358/228

[56] References Cited

U.S. PATENT DOCUMENTS 2,875,276  2/1959  Donnay .............................. 358/228

Primary Examiner—Robert L. Richardson
Attorney, Agent, or Firm—R. S. Sciascia; Henry Hansen; Armand M. Vozzo, Jr.

[57] ABSTRACT

An automatic exposure control system is disclosed for TV cameras, particularly those of the active type wherein a pulsed light source provides scene illumination for the camera. The control system includes a major control loop wherein an instantaneous photocathode current signal is time-separated from the total sensor signal of an image tube and integrated to provide a real-time measure of the total instantaneous light input upon the photocathode of the tube. When the total light input reaches a predetermined exposure level, a pulse is generated for gating off the image tube via a high voltage supply therefor so that a constant effective exposure is provided the photocathode. Peak levels of the photoelectron current are used to vary the amount of light entering the system and a conventional video detector is included to regulate the photocathode voltage thereby permitting a relatively constant video output signal to be maintained throughout a wide range of input light conditions.

6 Claims, 2 Drawing Figures

AUTOMATIC EXPOSURE CONTROL FOR PULSED ACTIVE TV SYSTEMS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to automatic light level controls for TV camera systems and more particularly to an improved automatic light control circuit that provides a constant effective exposure to the image tube photocathode of an active TV camera system.

Operation of TV camera systems under conditions of variable scene illumination requires some control of camera sensitivity, specifically that of the image tube, to protect the tube from excessive photo-emission and photoelectron flow at high light levels and to provide generally a constant video output signal. Such sensitivity control may be manual but for the most part have been automatic and in the form of electronic circuits commonly called automatic light control (ALC) circuits.

In conventional implementations of ALC circuitry, a scanned video output signal of the image tube is sampled at one or more points along a video amplifier chain. These video samples are then compared to a reference value and used to adjust certain parameters including optical transmission via an adjustable iris opening, sensor gain, and video amplification thereby controlling camera sensitivity.

While existing ALC circuitry have been successful in providing an effective means of sensitivity control for the image tubes of TV camera systems, such circuitry have been limited in their response time to several vertical scan intervals because of the sampled data nature of the video signal which, at any point in time, represents the time integral of scene illumination multiplied by system sensitivity for the preceding vertical interval. A lack of a fast-responding sensitivity control of the image tube has been particularly disadvantageous in applications of active TV cameras wherein a pulsed light source confined to either the vertical or horizontal retrace interval is utilized to provide the scene illumination for the camera.

SUMMARY OF THE INVENTION

Accordingly, it is a general purpose and object of the present invention to provide a fast-response system and technique for controlling the image tube sensitivity of a TV camera system under conditions of variable scene illumination.

Another object of the present invention is to provide an automatic light level control system that furnishes a constant effective exposure in real-time to the image tube of an active TV camera.

A further object of the present invention is to provide real-time sensitivity control for active TV cameras wherein frame-by-frame level control is achieved with rapid scene changes or variations in pulsed illumination producing no detectable changes in video output of the camera.

A still further object of the present invention is to provide an improved automatic exposure control for a pulsed active TV camera that is simple yet reliable, economic to manufacture, and easily incorporated in existing cameras.

Briefly, these and other objects of the present invention are accomplished by an automatic exposure control system for TV cameras particularly those of the active type wherein a pulsed light source provides scene illumination for the camera. The control system includes a major control loop wherein an instantaneous photocathode current signal is time-separated from the total sensor signal of an image tube and integrated to provide a real-time measure of the total instantaneous light input upon the photocathode of the tube. When the total light input reaches a predetermined exposure level, a pulse is generated for gating off the image tube via a high voltage supply therefore so that a constant effective exposure is provided the photocathode. Peak levels of the photoelectron current are used to vary the amount of light entering the system and a conventional video detector is included to regulate the photocathode voltage thereby permitting a relatively constant video output signal to be maintained throughout a wide range of input light conditions.

For a better understanding of these and other aspects of the present invention, reference may be made to the following detailed description taken in conjunction with the accompanying drawing in which like reference characters designate like items throughout the figures thereof.

DESCRIPTION OF THE PREFERRED EMBODIMENT

Figure 1:
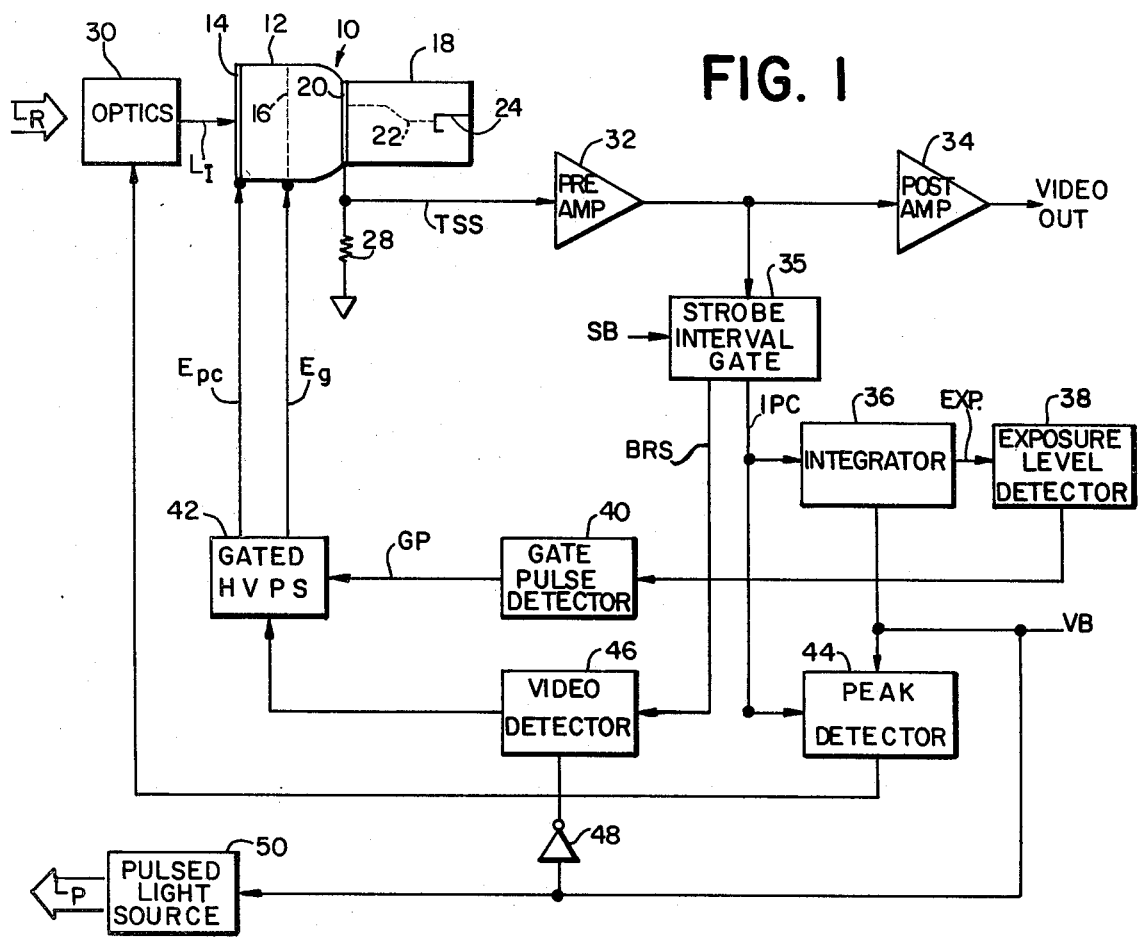
FIG. 1 is a block diagram showing an automatic exposure control system for an active TV camera according to the present invention.

Referring now to FIG. 1, the automatic exposure control system of the present invention is shown incorporated within a portion of an active TV camera. A pulsed light source 50, such as a strobe flash lamp, having a predetermined pulse width, for example about 1.0 millisecond, is connected to receive a vertical interval blank pulse VB from a conventional pulse-generating circuit (not shown) of the camera so that a short, relatively intense burst of light $L_P$ is produced that is synchronized to the vertical retrace period of the camera. Light pulse $L_P$ is directed at a scene to be viewed and is reflected therefrom through a medium, such as air or water, as a return illumination $L_R$ which varies as a function of scene range, reflectance, and transmissivity of the medium. An optical assembly 30 which includes lenses and an adjustable iris, controlled in a manner described in greater detail hereinafter, is positioned at the front end of the system to receive the illumination $L_R$ returned from the scene. The optical assembly 30 transmits a desired amount of the return illumination $L_R$ received and thereby provides focused incoming illumination $L_I$ to the TV camera.

A conventional TV camera image tube 10 which converts optical images into electrical video signals is positioned to receive the incoming illumination $L_I$ from optical assembly 30. Image tube 10 includes an image section 12 having a conventional photocathode 14 upon the front surface of which the incoming illumination $L_I$ impinges. By connection to a gated high voltage supply 42, the photocathode 14 is maintained at a constant photocathode voltage $E_{pc}$ that provides the photocathode with an electrostatic accelerating field of sufficient magnitude to cause an emission of photoelectrons from the rear surface of the photocathode as the incoming light $L_I$ impinges thereon. A focus grid 16 is spaced from the photocathode 14 within the image section 12 and is connected to receive a grid voltage $E_g$ from power supply 42 for controlling the photoelectron emission flow through the image section.

A target 20 of silicon or other suitable charge storage material separates the image section 12 from a readout section 18 of image tube 10. Target 20 is positioned to be bombarded upon its forward read-in surface by the photoelectron emission from photocathode 14 thereby creating an amplified positive charge area on the rearward read-out surface of the target corresponding to the illumination pattern on the forward surface of the photocathode. In readout section 18, a focused electron beam 22 from a cathode 24 of conventional design scans the image-representative charge pattern on the read-out surface of target 20 in controlled horizontal and vertical sweeps thereby discharging the positively charged areas and producing a video current in a target load resistor 28 coupled between the target and signal ground. The target load resistor 28 is tapped along its connection to target 20 so that a total sensor signal TSS is provided indicative of the incoming illumination $L_I$ impinging on the photocathode 14 of image tube 10.

Figure 2:
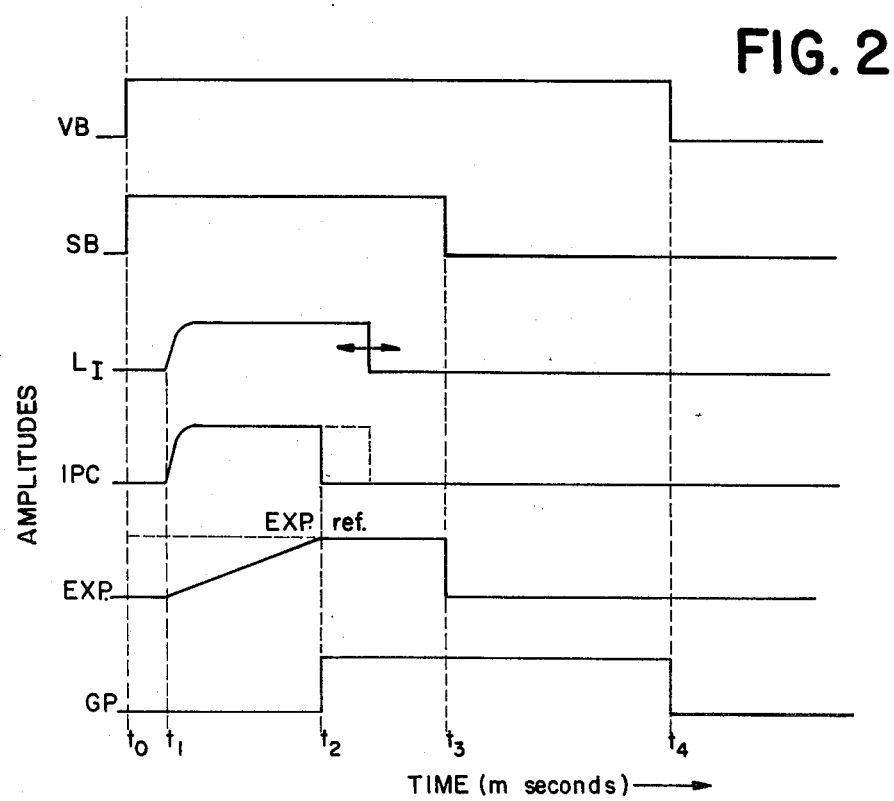
FIG. 2 is a timing diagram depicting various operating signals of the automatic exposure control system of FIG. 1.

For each light pulse $L_P$ emitted and returned, the total sensor signal TSS from image tube 10 is composed of a beam readout signal BRS and a photocathode current signal IPC. The beam readout signal BRS is attributed to the discharge of target 20 by beam 22 of readout section 18 and is a function of the photocathode voltage $E_{pc}$ and the input illumination $L_I$ integrated over the previous vertical scan interval. The photocathode current signal IPC, which is an additional component of the total sensor signal TSS not attributable to the readout beam 22, consists of the primary photoelectrons emitted from photocathode 14 and returned to signal ground through target load resistor 28. It should be noted that the photocathode current signal IPC is independent of photocathode voltage $E_{pc}$ provided that the electrostatic field seen by photocathode 14 exceeds the threshold necessary for electron emission, and that the amplitude of the signal provides a real-time measure of the total instantaneous amount of the light input $L_I$ incident on the entire photocathode. In conventional TV systems having continuous illumination, the photocathode current signal IPC is a relatively small background signal in relationship to the beam readout signal BRS. However, in the reactive TV camera system of the type herein employed, the pulsed illumination $L_P$ from light source 50 results in a relatively large pulse of photocathode current IPC, as shown in FIG. 2, the amplitude of which is comparable with that of the beam readout signal. Furthermore, since the pulse of photocathode current IPC occurs during the vertical blank period of the camera, the photocathode current signal is completely separable from the beam readout signal BRS.

A video preamplifier 32 of conventional design is connected to receive the total sensor signal TSS. Output from preamplifier 32 is fed to a post amplifier 34 for further amplification and processing of sensor signal TSS thereby providing a video output. A strobe interval gate circuit 35 is also connected to receive the output from preamplifier 32 so that the photocathode current signal IPC is provided to control the exposure level of image tube 10 in accordance with the present invention. Gate circuit 35 is a switching gate triggered by a strobe blank pulse SB that is initiated simultaneously with the leading edge of the vertical blank pulse VB. The strobe blank pulse SB is generated by conventional digital means (not shown) and is timed so that the pulse of incoming light $L_I$ returning from the scene is contained within the duration of the strobe blank pulse. The strobe blank pulse SB is fed the strobe interval gate circuit 35 for triggering the switching of the gate circuit thereby time-separating the two signal components of the total sensor signal TSS, passing the photocathode current signal IPC and blocking the beam readout signal.

An integrator circuit 36 enabled by the vertical blank pulse VB is connected to receive the photocathode current signal IPC from the strobe interval gate circuit 35. The integrator circuit 36 processes the photocathode current signal IPC, a function of the incoming illumination $L_I$ incident on photocathode 14, and thereby provides an exposure level output signal EXP that is proportional to the total effective photon input to the photocathode. It should be understood that at any time during the strobe interval ($t_0$ to $t_3$, as shown in FIG. 2), the exposure level signal EXP is proportional to the total photocathode exposure integrated to that instant.

An exposure level detection circuit 38 is connected to receive the exposure level output signal EXP from integrator circuit 36. The detection circuit 38 senses the amplitude of the exposure level signal EXP and is preset to signal a gate pulse generator 40 when the exposure level signal reaches a reference exposure level $EXP_{ref}$. The reference exposure level $EXP_{ref}$ is a preestablished value representataive of the desired amount of photon input to the photocathode 14 of image tube 10 taking into consideration the video amplification of the system and the sensor gain of the tube.

The gate pulse generator 40 connected to receive the output signal from the exposure level detection circuit 38 outputs a gate pulse GP to the gated high voltage power supply 42. As shown in FIG. 2, the gate pulse GP has its leading edge coincident with the attainment of the reference exposure level $EXP_{ref}$ by the exposure level signal EXP (at $t_2$), and is of a duration extending beyond the maximum expected pulse of incoming light $L_I$, the duration being generally limited by the repetition rate of the vertical interval blank pulse VB. The trailing edge of the gate pulse GP may, for example, coincide with the trailing edge of the vertical blank pulse VB, as shown in FIG. 2 at $t_4$. The gated high voltage power supply 42 is fed the gate pulse GP from gate pulse generator 40 for triggering the application of an amplified voltage pulse coincident with the gate pulse to the focus grid 16 thereby adjusting grid voltage $E_g$ so that the image section 12 of image tube 10 is gated off. This has the effect of preventing any further photoelectron emissions by reducing the electrostatic field seen by photocathode 14 below the threshold necessary therefor. Accordingly, there is a constant photoelectron input to target 20 per incoming light pulse $L_I$. It should be noted that since the total number of photoelectrons emitted per vertical scan is held constant, the total sensor signal TSS becomes independent of the input light $L_I$ and a function only of the photocathode voltage $E_{pc}$ which is constant.

A peak level detection circuit 44 is enabled by the vertical interval blank pulse VB and is connected to receive the photocathode current signal IPC from the strobe interval gate circuit 35 for sensing the peak amplitude of the photocathode current signal. It should be noted that since the shape and nominal duration of the pulsed illumination $L_P$ from light source 50 are fixed, the peak amplitude of the photocathode current signal IPC provides valid information for controlling the amount of incoming light $L_I$ into the image tube 10 by appropriately adjusting the iris opening of optical assembly 30. The peak level detection circuit 44 is preset with nominal limits for light energy reach' ıg photocathode 14, and depending upon whether the photocathode illumination $L_I$ is above, below, or within those nominal limits, the peak level detection circuit signals optical assembly 30 to close, open, or maintain the iris position, respectively. Accordingly, the control loop including the peak level detection circuit 44 limits the nominal range of the gating control loop previously described thereby increasing its fine control of light level exposure, and acts to extend the dynamic range of the exposure control system by correcting for large variations in the return illumination $L_R$ from the scene.

A conventional video detector 46 is connected to receive the beam readout signal BRS for controlling the level of the beam readout signal via adjustment of the photocathode voltage $E_{pc}$ of image tube 10. The video interval blank pulse VB is fed to video detector 46 via inverter 48 to enable the video detector to signal the gated high voltage power supply 42 during time intervals in which the integration circuit 36 and peak level detection circuit 44 are not providing exposure control. It should be noted that this control loop through video detector 46 is designed for a slow response and corrects for variations in scene highlight content.

The operation of the exposure level control system will now be summarized with reference to FIGS. 1 and 2. Pulsed illumination $L_P$ is emitted by pulsed light source 50 upon triggering by vertical interval blank pulse VB at $t_0$, and is reflected from a scene as return illumination $L_R$ to optical assembly 30. At $t_1$, input illumination $L_I$ of some certain duration, as indicated by the arrows in FIG. 2, is received at photocathode 16 of conventional TV camera image tube 10 connected to gated high voltage supply 42 for initiating photoelectron emissions from the photocathode that produce the total sensor signal TSS recovered from target load resistor 28. After processing by video preamplifier 32, the total sensor signal TSS, including the normal beam readout current signal and the photocathode current signal IPC, is time-separated by the strobe interval gate circuit 35 which is switched by the strobe interval blank pulse SB thereby providing the photocathode current signal exposure level control. The photocathode current signal IPC is integrated to provide an exposure level signal EXP indicative of the instantaneous total effective light exposure upon photocathode 14 and, when the exposure level signal reaches a predetermined reference level $EXP_{ref}$, exposure level detection circuit 38 signals the generation of gate pulse GP at $t_2$ in FIG. 2. The gate pulse signal GP triggers gated high voltage supply 42 to apply an amplified volage pulse coincident with the gate pulse signal to focus grid 16 thereby gating off image section 12 at $t_2$ and cutting off ay additional photocathode current IPC (as shown in dotted outline) so that a constant photoelectron input to target 20 per light pulse LP is achieved and a constant effective exposure to photocathode 14 is provided. Peak amplitude of the photocathode current signal IPC is sensed by peak level detection circuit 44 for appropriately signaling optical assembly 30 to adjust its iris opening so that the amount of incoming light $L_I$ is controlled. Video detector 46 is fed beam readout signal BRS for adjusting photocathode $E_{pc}$ to correct for variations in scene highlight content so that a constant video output signal is provided throughout a wide range of input light conditions.

Therefore, it is apparent that the disclosed automatic exposure control system provides an improved fast-responding means and method for controlling the image tube exposure of a TV camera under conditions of variable scene illumination. In addition, the disclosed invention provides light level control whereby a constant effective exposure upon the image tube of an active TV camera is produced and frame-by-frame level control is achieved with rapid scene changes and variations in pulsed illumination producing no detectable changes in the video output of the camera. Furthermore, the disclosed exposures control system for a pulsed active TV camera is simple yet reliable, economic to manufacture, and easily incorporated in existing cameras.

Obviously, other embodiments and modifications of the present invention will readily come to those of ordinary skill in the art having the benefit of the teachings presented in the foregoing description and drawing. It is therefore to be understood that various changes in the details, materials, steps, and arrangements of parts, which have been described and illustrated to explain the nature of the invention, may be made by those skilled in the art within the principle and scope of the invention as expressed in the appended claims.

What is claimed is:

1. An exposure control system for television cameras of the type wherein a pulsed light source provides input illumination, comprising:
    image tube means for converting the input illumination to an electrical video signal, said electrical video signal including a photocathode current signal;
    switch means coupled to said image tube means for time-separating said photocathode current signal from said electrical video signal; and
    first control loop means connected to said image tube means and said switch means for processing said photocathode current to determine the total instantaneous input illumination upon said image tube means so that said image tube means is gated off when the total instantaneous illumination reaches a predetermined level.

2. An exposure control system as recited in claim 1, wherein said first control loop means comprises:
    integrator means connected to said switch means for integrating said photocathode current signal thereby providing a real-time measure of the total instantaneous input illumination upon said image tube means;
    detector means connected to said integrator means for sensing a predetermined level of total instantaneous input illumination; and
    gating means connected to said detector means for gating off said image tube means when the predetermined level of total instantaneous input illumination is reached.

3. An exposure control system as recited in claim 2, wherein said gating means comprises:

pulse generator means for producing a gate pulse signal when the predetermined level of total instantaneous input illumination is reached; and power supply means coupled between said image tube means and said pulse generator means for applying said gate pulse to said image tube means thereby gating off said image tube means for the duration of said gate pulse.

4. An exposure control system as recited in claim 1, further comprising:

second control loop means connected to said image tube means and said switch means for varying the amount of input illumination upon said image tube means.

5. An exposure control system as recited in claim 4, wherein said second control loop means comprises:

peak detector means connected to said switch means for sensing the peak amplitude of said photocathode current signal; and optical means connected to said peak detector means and coupled to said image tube means for varying the input illumination to said image tube means in accordance with the peak amplitude of said photocathode current signal.

6. An exposure control system as recited in claim 5, further comprising:

third control loop means connected to said image tube means and said switch means for adjusting said image tube means to correct for variations in highlight content of the input illumination to said image tube means.

* * * * *